United States Patent
Munisteri

(10) Patent No.: US 8,424,784 B1
(45) Date of Patent: Apr. 23, 2013

(54) FRACTURE WATER TREATMENT METHOD AND SYSTEM

(75) Inventor: Joseph G. Munisteri, Houston, TX (US)

(73) Assignee: MBJ Water Partners, Houston, TX (US)

( * ) Notice: Subject to any disclaimer, the term of this patent is extended or adjusted under 35 U.S.C. 154(b) by 0 days.

(21) Appl. No.: 13/594,497

(22) Filed: Aug. 24, 2012

Related U.S. Application Data

(60) Provisional application No. 61/676,628, filed on Jul. 27, 2012.

(51) Int. Cl.
*B02C 19/00* (2006.01)
*B02C 21/00* (2006.01)
*B02C 23/00* (2006.01)

(52) U.S. Cl.
USPC ............... 241/3; 241/21; 241/24.11; 241/23; 241/65; 241/81

(58) Field of Classification Search ............... 241/3, 21, 241/23, 24.11, 65, 81, 101.8
See application file for complete search history.

(56) References Cited

U.S. PATENT DOCUMENTS

| | | | |
|---|---|---|---|
| 3,469,961 A | 9/1969 | Barnhart | |
| 4,126,181 A | 11/1978 | Black | |
| 4,472,171 A | 9/1984 | Broderick | |
| 4,917,785 A | 4/1990 | Juvan | |
| 4,944,905 A | 7/1990 | Gibb et al. | |
| 5,053,082 A | 10/1991 | Flanigan | |
| 5,076,179 A | 12/1991 | Carpenter | |
| 5,431,236 A | 7/1995 | Warren | |
| 5,529,675 A | 6/1996 | Adamski et al. | |
| 5,814,230 A | 9/1998 | Willis | |
| 6,045,913 A | 4/2000 | Castle | |
| 6,063,267 A | 5/2000 | Crewson et al. | |
| 6,102,310 A | 8/2000 | Davenport | |
| 6,110,361 A | 8/2000 | Bower et al. | |
| 6,132,630 A | 10/2000 | Briant | |
| 6,214,092 B1 | 4/2001 | Odom et al. | |
| 6,420,497 B1 | 7/2002 | Kufeld et al. | |

(Continued)

FOREIGN PATENT DOCUMENTS

| | | |
|---|---|---|
| WO | 03023177 A2 | 3/2003 |
| WO | 2010121399 A1 | 11/2010 |
| WO | 2012154932 A1 | 11/2012 |

OTHER PUBLICATIONS

Slater, Martin et al., Unique Offshore Recovery System Dramatically Reduces Environmental Impact by Recycling Stimulation Proppant, Proceedings of the Drilling Conference, Feb. 26, 2002, p. 243-252, Society of Petroleum Engineers.

(Continued)

*Primary Examiner* — Faye Francis
(74) *Attorney, Agent, or Firm* — Gordon Arnold; Arnold, Knobloch & Saunders, L.L.P.

(57) ABSTRACT

Methods for creating a proppant of a specific size from a slurry extracted from a fractured hydrocarbon well is provided, including the steps of separating water from the slurry, resulting in a solid stream and a liquid stream; mixing the slurry stream with particulate, resulting in a feed material; fusing proppant material in the feed material; quenching the fused proppant material; breaking the fused proppant material; sizing the broken material for the specific size; and mixing broken material that is not of the specific size with the feed material. A system for performing the method is also described.

25 Claims, 9 Drawing Sheets

U.S. PATENT DOCUMENTS

| | | |
|---|---|---|
| 6,533,946 B2 | 3/2003 | Pullman |
| 6,582,600 B1 | 6/2003 | Hashmi |
| 6,875,728 B2 | 4/2005 | Gupta |
| 6,962,200 B2 | 11/2005 | Nguyen et al. |
| 7,040,418 B2 | 5/2006 | Slater |
| 7,077,199 B2 | 7/2006 | Vinegar et al. |
| 7,451,820 B2 | 11/2008 | Albers |
| 7,461,696 B2 | 12/2008 | Nguyen |
| 7,520,342 B2 | 4/2009 | Butler |
| 7,568,535 B2 | 8/2009 | Larson et al. |
| 7,588,085 B2 | 9/2009 | Acock |
| 7,654,323 B2 | 2/2010 | Alary et al. |
| 7,785,400 B1 | 8/2010 | Worley |
| 7,798,218 B2 | 9/2010 | Garstad |
| 7,825,053 B2 | 11/2010 | Duenckel et al. |
| 7,841,394 B2 | 11/2010 | McNeel et al. |
| 7,845,409 B2 | 12/2010 | Shinbach et al. |
| 7,871,702 B2 | 1/2011 | Rao |
| 7,942,201 B2 | 5/2011 | Ekstrand et al. |
| 8,003,214 B2 | 8/2011 | Rediger et al. |
| 8,012,533 B2 | 9/2011 | Smith et al. |
| 8,043,419 B2 | 10/2011 | Folkvang |
| 8,047,288 B2 | 11/2011 | Skala et al. |
| 8,088,286 B2 | 1/2012 | Folkvang |
| 8,235,117 B1 | 8/2012 | Hill et al. |
| 8,261,832 B2 | 9/2012 | Ryan |
| 8,267,170 B2 | 9/2012 | Fowler et al. |
| 8,291,975 B2 | 10/2012 | Roddy et al. |
| 8,298,667 B2 | 10/2012 | Smith et al. |
| 2002/0048676 A1 | 4/2002 | McDaniel et al. |
| 2003/0164235 A1 | 9/2003 | Leeson |
| 2003/0168410 A1 | 9/2003 | Robicheaux |
| 2005/0274513 A1 | 12/2005 | Schultz et al. |
| 2006/0070740 A1 | 4/2006 | Surjaatmadja |
| 2008/0047198 A1 | 2/2008 | Mehlhose et al. |
| 2008/0110623 A1 | 5/2008 | Brannon |
| 2008/0135245 A1 | 6/2008 | Smith et al. |
| 2008/0156489 A1 | 7/2008 | Pershikova |
| 2008/0230222 A1 | 9/2008 | Garstad et al. |
| 2008/0283243 A1 | 11/2008 | Rediger et al. |
| 2009/0133872 A1 | 5/2009 | Shackelford |
| 2009/0152204 A1 | 6/2009 | Chantrel et al. |
| 2010/0071901 A1 | 3/2010 | Luo et al. |
| 2010/0089652 A1 | 4/2010 | Burnett |
| 2010/0187186 A1 | 7/2010 | Howdeshell et al. |
| 2010/0197532 A1 | 8/2010 | Rush et al. |
| 2010/0282462 A1 | 11/2010 | Xu et al. |
| 2011/0100924 A1 | 5/2011 | Duesel, Jr. |
| 2011/0146976 A1 | 6/2011 | Hackworth |
| 2011/0272156 A1 | 11/2011 | Johnson, Sr. |
| 2012/0000651 A1 | 1/2012 | Panga |
| 2012/0000653 A1 | 1/2012 | Panga et al. |
| 2012/0012307 A1 | 1/2012 | Nevin |
| 2012/0012309 A1 | 1/2012 | Noles, Jr. |
| 2012/0024525 A1 | 2/2012 | Svarczkopf et al. |
| 2012/0070339 A1 | 3/2012 | Lawal |
| 2012/0080191 A1 | 4/2012 | Smartt et al. |
| 2012/0085236 A1 | 4/2012 | McCorriston et al. |
| 2012/0097614 A1 | 4/2012 | Silva et al. |
| 2012/0227968 A1 | 9/2012 | Eldred et al. |
| 2012/0255735 A1 | 10/2012 | Hefley |
| 2012/0325472 A1 | 12/2012 | Litvinets et al. |
| 2012/0325474 A1 | 12/2012 | Bicerano |
| 2013/0000893 A1 | 1/2013 | Beasley et al. |
| 2013/0008660 A1 | 1/2013 | de Rouffignac et al. |

OTHER PUBLICATIONS

Suri, Ajay; Sharma, Mukul M., A Model for Water Injection Into Frac-Packed Wells, SPE Reservoir Evaluation & Engineering, Jun. 2010, p. 449-464, 16p, vol. 13 Issue 3.
Sparlin, Derry D.; Hagen, Raymond W. Jr., Proppant selection for fracturing and sand control, World Oil, Jan. 1995, p. 37-40, vol. 216.
Norris, M.R.; Bergsvik, L.; Teesdale, C., Multiple proppant fracturing of horizontal wellbores in a chalk formation: evolving the process in the Valhall Field, SPE Drilling & Completion, Mar. 2001, p. 48-59, vol. 16 Issue 1.
Hall, B.E.; McElfresh, Paul, Successful frac packs require careful planning, Oil & Gas Journal, Apr. 3, 2000, p. 37-44, vol. 98 Issue 14.
Nelson, Joyce, Frack Attack: New, dirty gas drilling method threatens drinking water, CCPA Monitor, Dec. 2009/Jan. 2010, p. 10-11.
Halperin, Alex, Drill, Maybe Drill?, The American Prospect, May 2010, p. 16-21.
Ali, Syed et al., Formation damage traced to contaminated completion fluids, Oil & Gas Journal, Aug. 12, 2002, p. 45-51.
Hall, Keith, Hydraulic Fracturing—A Primer, The Enterprise; Oct. 10, 2011, 5 pages.
Lowry, Jeff; Lloyd, Barry H., Haynesville trial well applies environmentally focused shale technologies, World Oil; Dec. 2011, 3 pages.
Reis, John, Coping with the Waste Stream from Drilling for Oil, Mechanical Engineering; Jun. 1992, 6 pages.
Gidley, John L. et al., Recent Advances in Hydraulic Fracturing, 1989, p. 221, Henry L. Doherty Memorial Fund of AIME, Society of Petroleum Engineers, Richardson, TX.
Smyth, Julie Carr, Ohio quakes put pressure on use of fracturing, 2012, Associated Press. pp. D1, D6.
Walser, Doug, Hydraulic Fracturing in the Haynesville Shale: What's Different?, 2011, Upstream Pumping Solutions, pp. 34-36.
Lowry, Jeff, et al., Haynesville trial well applies environmentally focused shale technologies, Dec. 2011, World Oil, pp. 39-40, 42.
Denney, Dennis, Technology Applications, Jan. 2011, JPT, pp. 20, 22, 26.
Beckwith, Robin, Hydraulic Fracturing The Fuss, The Facts, The Future, Dec. 2010, JPT, pp. 34-35, 38-41.
Ditoro, Lori K,The Haynesville Shale, 2011, Upstream Pumping Solutions. pp. 31-33.
Bybee, Karen, In-Line-Water-Separation Prototype Development and Testing, Mar. 2011, JPT, pp. 84-85.
Bybee, Karen, Produced-Water-Volume Estimates and Management Practices, Mar. 2011, JPT, pp. 77-79.
Cooling Tower Operators and Managers: Why Let Chemicals Clog Progress?, Jul. 1999, The Dolphin System Bulletin, 15 pages, vol. 1, No. 1, Clearwater Systems, LLC., Essex.
Katz, Jonathan, Report: Fracking to Grow U.S. Water-Treatment Market Nine-Fold by 2020, Industry Week, May 1, 2012, 2 pages, Penton Media, Inc.
Almo offers Allgaier screening machines for hazardous areas, Mining Engineering, Feb. 2012, 1 page, SME, Englewood.
Denney, Dennis, Fracturing-Fluid Effects on Shale and Proppant Embedment, JPT, Mar. 2012, pp. 59-61.
Keasler, Vic, Real-Time Field Monitoring to Optimize Microbe Control, JPT, Apr. 2012, pp. 30, 32-33.
Rassenfoss, Stephen, Stephen, Companies Strive to Better Understand Shale Wells, JPT, Apr. 2012, pp. 44-48.
Denney, Dennis, Stimulation Influence on Production in the Haynesville Shale: A Playwide Examination, JPT, Mar. 2012, pp. 62-66.
Zdunczyk, M.J., Hydraulic Fracturing Sand (Frac Sand), Mining Engineering, Jun. 2012, pp. 59-61, vol. 64, No. 6, SME, Englewood.
Perry, Robert H.; Green, Don W., Perry's Chemical Engineers' Handbook, 1984, pp. 7-12, 7-16, 8-23, 8-25, 8-32, 20-41, 21-16, 21-15, 21-21, 6th ed., McGraw-Hill, Inc.
Hydraulic Fracturing Fluids, Evaluation of Impacts to Underground Sources of Drinking Water by Hydraulic Fracturing of Coalbed Methane Reservoirs, Jun. 2004, pp. 1-26.
Bahamdan, Ahmad, Hydrophobic Guar Gum Derivatives Prepared by Controlled Grafting Processes for Hydraulic Fracturing Applications, Louisiana State University, Aug. 2005, pp. 1-120.
Slider, Alison; Gold, Russell and Lefebvre, Ben, Drillers Begin Reusing Frack Water, Wall Street Journal, Nov. 20, 2012, pp. B1 and B4.
Kim, Tak-Hyun et al., Pilot scale treatment of textile wastewater by combined process (fluidized biofilm process-chemical coagulation-electrochemical oxidation), Water Research, Aug. 6, 2001, pp. 3979-3988, Elsevier Science Ltd..
Hardik, Shah V., Electrochemical Oxidation of Organic Pollutants, Chemical Engineering Department, Sarvajanik College of Engineering and Technology, Jan. 2003, 10 pages.
Rau, Greg H., Electrochemical Splitting of Calcium Carbonate to Increase Solution Alkalinity: Implications for Mitigation of Carbon Dioxide and Ocean Acidity, Environmental Science & Technology, Feb. 6, 2008, pp. 8935-8940, vol. 42, No. 23.

Gies, Erica, Race Is On to Clean Up Hydraulic Fracturing, The New York Times, Dec. 4, 2012, 3 pages, New York.

Rassenfoss, Stephen, From Flowback to Fracturing: Water Recycling Grows in the Marcellus Shale, JPT, Jul. 2011, pp. 48-51.

Produced water recycling oasis flourishes in Wyoming, American Water Intelligence, Feb. 2011, 2 pages, vol. 2, Issue 2, USA.

Dale, Walter, The Biggest Myths about Water in Completions, Halliburton Solutions Blog, Aug. 1, 2012, 3 pages.

MVC Evaporators recyde oilfield wastes, GW Desalination.com, Sep. 10, 2012, 3 pages, vol. 48, Issue 35, USA.

Industrial Products: AquaTex COG, Wastewater Resources Inc., 2010, 4 pages.

Cookson, Colter, Technologies Enable Frac Water Resuse, The American Oil & Gas Reporter, Mar. 2010, 4 pages, Drake Water Technologies.

Oil Field Case Study: Maximizing Frac Water Reuse with Chlorine Dioxide, Sabre Energy Services, LLC, 2011, 2 pages.

Jenkins, Scott, Oxidation-based water-reuse technology that improves mass transfer, Chemical Engineering, Feb. 1, 2013, 3 pages.

Clean Stream Offers Cost-Effective Solution to Meet Marcellus Wastewater Regulations, PR Newswire, May 5, 2011, 1 page.

VAPCO Vapor Compressor, Frac Water Solutions, 3 pages, 2011.

Mazerov, Katie, On-the-fly system treats, recycles frac water, Drilling Contractor, Nov. 21, 2011, 2 pages.

Western Pennsylvania Process Engineering Allowing Reuse of Marcellus Shale Frac Water, Process Plants Corporation, 2010, 2 pages.

Proven Process, CRS Reprocessing LLC, 2011, 2 pages.

Marcellus Produced Water Case Study, CRS Reprocessing LLC, 2011, 2 pages.

Frac water recycling contract awarded to Ecosphere, Water World, Sep. 16, 2010, 3 pages.

Fracture Water Recycling, Kerfoot Technologies, 32 pages, 2011.

Kidder, Mark et al, Treatment options for reuse of frac flowback and produced water from shale, World Oil, Jul. 2011, 4 pages.

Lidji, Eric, Membranes possible key to recycling frac water, Greening of Oil, Feb. 11, 2010, 4 pages.

Mobile Evaporator—Treat Shale Gas Frac Water at the Well Site Fact Sheet, GE Power & Water, Oct. 2010, 2 pages.

Mobile evaporator, GE Power & Water, 1997, 2 pages.

Electrocoagulation, Water Tectonics, 2013, 2 pages.

Electrocoagulation, Wikipedia, Jan. 3, 2013, 6 pages.

Electrocoagulation Technology, Powell Water Systems, Inc., 1994, 2 pages.

FRACTURE WATER TREATMENT METHOD AND SYSTEM

CROSS-REFERENCE TO RELATED APPLICATIONS

This application claims priority to U.S. Provisional App. No. 61/676,628, filed Jul. 27, 2012.

BACKGROUND OF THE INVENTION

This invention concerns the apparatus and processing steps for treating the flow-back and produced water and the other constituents that are used to hydraulically cause the creation of channels or fractures or fissures in hydrocarbon wells (for example, deep oil-shale deposits).

Over the centuries, people have tried different ways to take advantage of and use the inherent qualities of naturally-occurring hydrocarbon compounds to enhance his life style and cope with the many challenges of existence. For over two thousand years, the "Burning Sands" of Kirkuk, in Iraq, provided heat to Kurdish tribes, which came from the methane gas that seeped upwards from deep Geological formations to the Earth's surface only to be ignited and burn continuously to this day. Also the surface seepages of crude oil, in Pennsylvania and California, were used by the American Indians to water-proof the canoes that they used in traveling on the waterways of North America. These are only two early examples of man's utilization of natural gas and crude oil to improve his way of life.

Drake's successful drilling of a shallow crude oil well in Pennsylvania, in the late Nineteenth Century, marked the beginning of man's greatest period of economic growth driven, in great measure, by the rapid strides that were made in the exploration, production, and refining, of naturally-occurring gaseous and liquid hydrocarbon compounds. They are now used for transportation fuels, power generation, lubricants, petrochemicals, and the many thousands of other products and applications that we use in our daily lives today. The birth and development of what we now call "the Oil Industry" is one of the major principal factors and enabling driving forces contributing to the establishment and spectacular growth in the world's economy. This period of economic development is known as "The Industrial Revolution."

During this period, many new oil fields were discovered in many parts of the world and the growth in the demand for crude oil and petroleum products grew at a fantastic rate due to the many new uses for petroleum-derived products that continued to be discovered well into the Twenty-First Century. Throughout this period the Oil Industry found many oil new fields or large deposits or reservoirs of conventionally varying hydrocarbon mixtures of liquid and gaseous compounds (both on land and offshore in the various bodies of water throughout the world). At the same time, the Industry also discovered the existence of large quantities of heavy and light hydrocarbon compound mixtures that were nonconventional in structure and were so enmeshed in the complex material matrixes that the hydrocarbon molecule compounds contained therein could not be extracted economically.

These nonconventional hydrocarbon compound sources fall into two distinctly different categories. Firstly there are the "heavy" or long-chain hydrocarbon molecule compounds such as the oil sands deposits in Canada and the heavy oil deposits in the Kern River or Bellridge regions of California or in the heavy oil belt of the Orinoco river delta region in Venezuela or the Mayan oil in Mexico were the heavy oil produced was extremely viscous and was in a semi-solid state at ambient temperatures. In these cases pour point or viscosity reduction was of primary importance. Secondly there are the "light" or "short-chain" hydrocarbon molecule compounds that are entrapped in various shale deposits throughout the United States and in many other areas in the world.

In certain countries of the world, namely in Spain, Estonia and Brazil there are large, but shallow, oil shale deposits where those countries did not have large reserves or deposits of conventional crude oil. There, a "brute force" method for the extraction of shale oil or kerogen was carried out by heating the shale rock in high temperature pressurized retorts. This practice was started as early as the nineteen twenties. The extracted kerogen or shale oil fuel was then burned in furnaces for heating purposes as well as a transportation fuel for diesel and other internal combustion engines. The extracted kerogen fuel had about the same b.t.u. fuel value and combustion characteristics as regular-grade gasoline or petrol as produced from conventional crude oil refining facilities. Those countries also did not have the necessary amount of hard currency or United States Dollars to buy conventional crude oil on the international commodities market but they did have large volumes of shale rock (although the amount of shale oil or Kerogen extracted from these shale deposits was less than four percent by weight of the shale rock itself, leaving about ninety five percent of the shale rock as waste materials). The hot condensable hydrocarbon compounds were liquefied in a conventional condensing heat exchanger unit and became the kerogen fuel. The non-condensable hydrocarbons, mainly methane, were flared or just released into the atmosphere. All these short-chain or light hydrocarbon compounds are trapped or sealed within the oil shale material matrix structure and when heated, under pressure, they are released or liberated from this matrix in a gaseous phase.

In the United States, there are many areas where oil shale rock deposits are to be found, but most of them are located as deep deposits five to ten thousand feet below the surface of the earth. As early as before the nineteen twenties, many attempts made to mine or extract the kerogen oil from stratified shale formations. Although the shale oil proved to be a very suitable hydrocarbon product, its cost of production was well in excess of the market price of similar products; thus this situation proved to be uneconomical. Additional development and investment was not justified at that time.

All of these factors and conditions have changed dramatically over the past years due, primarily, to the rapid development and exploitation of two specialized technologies. The first of these is the carefully controlled and steerable directional drilling techniques that allowed rigs to be able to initially drill vertically and then be controlled or steered to rotate into a horizontal position while drilling to a pre-determined depth. The drilling could then continue to drill well bores horizontally in the shale formation for a considerable distance. The second most important technological development was the application of an old process, namely the practice of hydraulically fracturing older vertical oil wells in order to increase the flow rate as well as to promote the further stimulation of the older, oil wells and thereby extend the economic life of the depleting oil fields.

Over the years many different techniques were developed and implemented in an attempt to extend the productive life of older oil and more mature oil field fields. Water flooding was one of the practices that was employed to maintain reservoir pool pressure in depleting oil fields as well as the injection of pressurized methane gas (when available and not being flared) in order to achieve the same result. Another technique that was tried was the use of "Shaped Charges" of explosives that were strategically placed in well casings so they could be detonated in the pay zone areas in the well bore and the force of these explosions penetrated the wall of the casing and caused fractures or fissures to be opened.

Such methods for EOR (Enhanced Oil Recovery) were the oil industry norm for many years. However some oil companies were concerned about the dangers in using explosives as a means of extending the productive life of depleting oil fields; and, in the late nineteen forties, the practice of using highly-pressured water and sand mixtures to produce fissures or fractures in the pay-zone areas began. This technique was developed to try to increase the rate of flow in the oil well and also to extend the productive life of a mature and depleting oil field without the use of explosives. Opening new channels hydraulically in the older pay zones made it easier for the liquid and gaseous hydrocarbons to flow freely under bottom hole pressure up to the surface for collection as crude oil and gas products.

Also the practice of using work-over rigs to clean out old oil well casings that had restricted hydrocarbon flows due to the accumulation of asphaltic or paraffinic compounds was wide-spread during this period.

The use of all these types of oil well stimulation practices, as well as the use of other enhanced oil recovery techniques, continued over a long period of time and many improvements were developed over the years. One of these improvements was the development of the larger capacity and more powerful barite mud pumps that were needed to assist in the drilling of deeper and deeper oil wells, both onshore as well as offshore. Some of these oil wells were drilled in water depths exceeding eight thousand feet; further drilling depths adding more than twenty thousand feet, and thus there was a need to enlarge the capacity and increase the pressure capability level of the hydraulic fracturing pumps as well.

The discovery of a number of large deposits of oil shale formations, plus the newly developed technologies of steerable directional drilling capabilities, coupled with the ability to use highly pressurized hydraulic fracturing equipment, allowed the industry to proceed with these new fracturing techniques. They were able to directionally drill, both vertically and horizontally, in the deep shale formations and then hydraulically fracture the formation to release the gaseous and liquid hydrocarbons that were contained in the shale matrix material formations. These new technologies have caused an economic "sea change" in how the world now values liquid and gaseous hydrocarbons in the global energy commodities market.

However, during the period when the application of hydraulic fracturing was becoming more wide spread, its growth, technologically and operationally, was carried out in a very haphazard, hit and miss, ad hoc manner. Many of the improvements that were made were the result of unscientifically developed trial and error attempts to improve the rate of production in an oil well as well as trying to extend the economic life of established oil fields. This was all done without the benefit of fully examining or understanding the sound scientific reasons behind the need for those improvements. The best example of this unscientific approach, in trying to solve specific processing problems, is what was occurring in the proper selection and use of various types of proppants in the hydraulic fracturing process.

After the initial pressurized water fracturing is accomplished, strong proppant materials need to remain in the fissures or fractures that are produced by the pressurized water technique if the desired increase in the flow rate of the produced hydrocarbons is to be achieved. Proppants are the selected means of "propping up" the new openings or cracks in the formations, so that they will continue to keep the new fractures or fissures open and to allow the hydrocarbon compounds to flow freely into the well bores so they can be discharged through the well head's control equipment.

Without the proper proppants that are strong enough and correctly sized to keep the fissures continuously open, the well's production rate will decline rapidly as proppant fines and softer material particles fill up the fissures. These will decrease the rate of flow and ultimately block the flow of hydrocarbons into the well bore. Many types of sands having different compositions, shapes and sizes were tested as well as many other types of proppant materials such as aluminum oxides, etc.

The key issue here is that the proper proppant that should be used in a hydraulic fracturing process is the single most important factor that is needed in achieving and maintaining the proper "voids ratio" that is needed in the pressurized water fractured channels to be able to realize the full benefit of the hydraulic fracturing process.

While these considerations are important in hydraulic fracturing in vertically drilled oil wells with selected pay zones, they are far more critical and important when applying the hydraulic fracturing process in horizontally-layered oil shale formations. As a result of the magnitude of the "Shale Gas Revolution" we are now just starting to learn more and understand more about the nature and characteristics of the various types of shale formations.

Oil shale is a form of sedimentary deposits that were laid down eons ago in the form mainly of calcium carbonates, sodium carbonates, calcium bicarbonates, quartz as well as soil materials and other compounds that became entrapped in the matrix of materials as these oil shales were being formed and ultimately deposited in the shale formations that we know about today. Many oil shale formations cross tectonic fault lines in the crust of the earth and thus can be discontinuous in their configuration. Some oil shale formations are slightly inclined in both the vertical and horizontal planes. As a result, wire line tracking as well as three dimensional seismic analyses becomes an important part of the shale gas exploration and development process.

Retrospectively it is important to recognize and stress the critical function that properly structured and sized proppants perform for the optimum extraction and production of gaseous and liquid hydrocarbon compounds which are the product as a result of the hydraulic fracturing of an oil shale deposit. This fact was not fully understood or appreciated, in the oil industry, until early in the twenty-first century. By the end of the twentieth century the Petroleum Industry had already been using the technique of hydraulic fracturing for enhanced oil recovery and oil well stimulation on producing wells for more than fifty years. All of the hydraulic fracturing operations that were carried out before the turn of the twenty first century were designed to extend the productive life of existing vertically drilled oil wells or achieve greater hydrocarbon flow rates for completed wells. All of these hydraulic fracturing operations were carried out in vertically-drilled oil wells and were fracturing pay zones that were essentially sand in composition, and were producing flowing liquid or gaseous hydrocarbons under bottom hole temperature and pressure conditions. All were in sand formations that had relatively high permeability and porosity values or good voids-ratio characteristics.

With the introduction of steerable vertical and horizontal drilling equipment together with very high pressure fracturing pumps (called by some "intensifiers"), the oil industry then applied the same hydraulic fracturing techniques that had been successfully developed and used in vertical oil well hydraulic fracturing operations and applied these same procedures to the well bores that were horizontally drilled in the deep shale formations but with less than satisfactory results. Some of the oil shale formations were more productive than others and a large number of approaches were attempted in order to try to increase the amount of encapsulated hydrocarbons that were released by hydraulic fracturing. Chemicals were added to try to control the growth of the water borne microorganisms that were impeding the flow of hydrocarbons, chemicals were also added in order to control corrosion and encrustations. Surface tension reducing chemicals were also added to try to make the fracturing water more capable of penetrating the fissures that were created by the highly pressured water. Some combination of steps were more successful in one area of oil shale than the same steps being taken and applied in another oil shale formation particularly in the difference in the percentage or amount of hydrocarbon product that was ultimately being extracted from a specific amount of hydrocarbon content in a given oil shale deposit.

It was not until the industry started to realize that the traditional principles of petroleum technology were not fully applicable to the newly developed attempts to extract entrapped liquid and gaseous hydrocarbons from mineral rock formations that did allow them to flow freely even in deep high temperature and high pressure locations. Petroleum engineers then turned to the principles of applying the examination of hard rock mechanics of minerals geology criteria in seeking a comprehensive analysis and understandable answer to these issues. Recently, research efforts proved that all shale formations could be categorized and could be roughly divided in to two distinct measurable and identifiable classifications being either a "soft shale" or a "hard shale." See, e.g. Denney, Dennis. (2012 March). Fracturing-Fluid Effects on Shale and Proppant Embedment. *JPT*. pp. 59-61. The test criteria are based upon the principle of measuring the stress/strain or Young's Modulus value of a given material both before and after fracturing. The test measures the nano indentation of a mineral after applying a specific stress level. Hard shales recorded low nano indentation values while the soft shales tested measured higher indentation values. The hard shales had mainly silica, calcium carbonates, calcites, and quartz in their composition along with colloidal clays; whereas the soft shales had sodium bicarbonates, nacolites and colloidal clay components.

The ability to accurately determine the true mineral characteristics of an oil shale is very important in selecting the best operational techniques that are needed in order to optimize or maximize the ultimate recovery of hydrocarbon components from a specific shale formation or deposit. Soft oil shale formations respond differently from hard oil shale formations after both have been subjected to the same level of hydraulic water pressure for the same soaking period of time. Hard oil shales, under high hydraulic pressures yield fissures or channels that are relatively short in penetration length and rather small in the cross sectional diameters of their fissures or flow channels. Soft oil shales, on the other hand, under the same high hydraulic pressure and soaking period yield fissures that are of greater length and have cross sectional diameters that are relatively larger than what can be achieved from the hydraulic fracturing of materials in the hard oil shale formations.

Aside from controlling the growth of microorganisms and the prevention of scale encrustations and "slick" water provisions, the most important factor in an operation's ability to extract the maximum or optimum amount of hydrocarbon from a given shale formation is the selection of the proper size and type of proppant that is carried into the fracture zone by the fracturing water. If the shale to be fractured is a hard shale the proppant must be of small enough size so that it can be carried into the small diameter fissures that are the result of the hard shale fracturing operation and strong enough to be able to keep the channel or fissure open long enough in order to allow the contained liquid or gaseous hydrocarbon product to flow freely horizontally and vertically in the well bore so as to be recoverable after being released to the surface facilities. If the proppant used is too large for the small diameter size fissure, the proppant will not penetrate into the fissure and remain there in order to keep the fissure channel open, and the amount of recoverable produced hydrocarbons will be significantly reduced. Alternatively if an operation is hydraulic fracturing in a soft shale formation the properly sized proppant should be larger in diameter than the proppant that would be suitable for use in a hard shale. This will allow the proppant to be carried into the larger diameter fissures that are the result of the hydraulic fracturing of a soft shale. A smaller size proppant would not be as effective and this would result in a significant reduction in the amount of hydrocarbon product that could be produced.

Now that we have more scientifically measureable data regarding the differences in the various types of oil shale formations the industry now realizes, more clearly, the economic importance of selecting the proper proppant for the hydraulic fracturing of various types of oil shale formations. The best proppant for hydraulically fracturing soft mineral shales we now know is different from the best proppant that we need to use when hydraulically fracturing a hard mineral shale. Thus, there is a need for specific proppants for specific oil shales.

An object of examples of the invention, therefore, is to provide a wide range of properly sized and constituted proppants using virtually all the slurry materials that are carried to the surface and are contained in the flow-back water stream from the hydraulic fracturing of gas and oil formations.

As a result of the rapid increase in the extent and amount of hydraulic fracturing of oil shale deposits being developed in a number of different areas in the United States, there has arisen a number of ecological and environmental concerns that must be addressed if the industry is to grow successfully. For instance toxic chemicals (such as glutaraldehyde) are used as a biocide to kill, control, or eliminate, the water borne micro-organisms that are present in the water used in the hydraulic fracturing process. There is great concern such toxic chemical-bearing fracturing water could migrate into a potable water aquifer. Also of concern is the possibility of friction-reducing chemicals (e.g., polyacrylamide) or scale inhibitors (e.g., phosphonate) finding their way into and contaminating an aquifer. Detergent soap mixtures as well as chemicals such as potassium chloride are commonly used as surface-tension-reducing surfactants and could create public health issues. The current practice of injecting brine-contaminated flow-back water into disposal wells is another of concern to the public.

In some examples of traditional fracturing jobs, after explosively perforating a horizontal well casing, a water mixture is injected at high pressure into a multitude of individually sequenced fracturing zones, each being sealed off at both ends by packer sleeves. This allows the water mixture to remain in the shale formation under pressure for several days, creating channels, fractures, or fissures which, when the hydraulic pressure is released by a coiled drilling operation, allow hydrocarbon gas and liquid elements to have passageways that allow flow to the surface. For each individual fracturing zone, the pressure in the water mixture is reduced in sequence so that the depressurized water flows back horizontally into the well bore and then proceeds upward in the vertical cemented well section to the ground surface elevation. Much of the proppant remains behind in these channels; however, a significant amount comes out in the back-flow water.

The flow-back water volume accounts for less than fifty percent of the amount of injected water used for the fracturing operation. The flow-back water stream also contains materials that are leached out of the shale formation such as bicarbonates, (e.g., nacolities). The flow-back water mixture also carries with it many volatile organic compounds as well as the micro-organism debris, any dissolved salts or brines, and a significant amount of the initially-injected proppant and their produced fines. Treatment and/or disposal of this flow-back are significant issues for the industry. For example, see Smyth, Julie Carr. (2012). Ohio quakes put pressure on use of fracturing. *Associated Press*. pp. D1, D6. Lowry, Jeff, et al. (2011 December). Haynesville trial well applies environmentally focused shale technologies. *World Oil*. pp. 39-40, 42. Beckwith, Robin. (2010 December). Hydraulic Fracturing The Fuss, The Facts, The Future. *JPT*. pp. 34-35, 38-41. Ditoro, Lori K. (2011). The Haynesville Shale. *Upstream Pumping Solutions*. pp. 31-33. Walser, Doug. (2011). Hydraulic Fracturing in the Haynesville Shale: What's Different? *Upstream Pumping Solutions*. pp. 34-36. Bybee, Karen. (2011 March). In-Line-Water-Separation Prototype Development and Testing. *JPT*. pp. 84-85. Bybee, Karen. (2011 March). Produced-Water-Volume Estimates and Management Practices. *JPT*. pp. 77-79. Katz, Jonathan. (2012 May). Report: Fracking to Grow U.S. Water-Treatment Market Nine-Fold by 2020. *Industry Week*. U.S. App. Pub. No. 2012/0012307A1; U.S. App. Pub. No. 2012/0024525A1; U.S. App. Pub. No. 2012/0070339A1; U.S. App. Pub. No. 2012/0085236A1; U.S. App. Pub. No. 2012/0097614A1. Each of the above references are incorporated herein by reference for all purposes.

Currently, it is common practice to kill micro-organisms that are in the water mixture, either initially or insitu, by chemical or other types of biocides so that the gaseous and liquid hydrocarbons that are trapped in the oil shale's matrix formation can flow freely into the channels and fissures vacated by the flow-back water mixture. Also, the channels created by the fracturing process must be kept open by the proppants that are initially carried into the fissures in the fracture zones by the injected water mixture. If the micro-organisms are not killed they will multiply, rapidly; and, if they remain in the fissures, they will grow and reduce or entirely block the flow hydrocarbons from these fissures. Another significant micro-organism type problem is the possible presence of a strain of microbes that have an affinity for seeking out digesting any free sulfur or sulfur bearing compounds and producing hydrogen sulfides that must be removed from any product gas stream because it is a highly dangerous and carcinogenic material. All these types of micro-organisms must be destroyed if this type of problem is to be avoided.

In addition to the possibility of micro-organisms multiplying and blocking the flow of hydrocarbon product, the presence of dissolved solids in the water solution can also be a problem in the injected water mixture, they can deposit themselves as scale or encrustations in the same flow channels and fissures. These encrustations, if allowed to be deposited in these channels, will also reduce or block the flow of hydrocarbons to the surface. In order to avoid this condition, attempts are made in current industry practice to have the dissolved solids coalesce and attach themselves to the suspended or other colloidal particles present in the water mixture to be removed before injection in the well; however, those efforts are only partly effective. See, e.g. Denny, Dennis. (2012 March). Fracturing-Fluid Effects on Shale and Proppant Embedment. *JPT*. pp. 59-61. Kealser, Vic. (2012 April). Real-Time Field Monitoring to Optimize Microbe Control. *JPT*. pp. 30, 32-33. Lowry, Jeff, et al. (2011 December). Haynesville trial well applies environmentally focused shale technologies. *World Oil*. pp. 39-40, 42. Rassenfoss, Stephen. (2012 April). Companies Strive to Better Understand Shale Wells. *JPT*. pp. 44-48. Ditoro, Lori K. (2011). The Haynesville Shale. *Upstream Pumping Solutions*. pp. 31-33. Walser, Doug. (2011). Hydraulic Fracturing in the Haynesville Shale: What's Different? *Upstream Pumping Solutions*. pp. 34-36. Denney, Dennis. (2012 March). Stimulation Influence on Production in the Haynesville Shale: A Playwide Examination. *JPT*. pp. 62-66. Denney, Dennis. (2011 January). Technology Applications. *JPT*. pp. 20, 22, 26. All of the above are incorporated herein by reference for all purposes.

In recent years, the oil industry has tried to develop a number of ways to address these concerns. The use of ultra violet light in conjunction with reduced amounts of chemical biocide has proven to be only partially effective in killing water borne micro-organisms. This is also true when also trying to use ultra-high frequency sound waves to kill micro-organisms. Both these systems, however, lack the intensity and strength to effectively kill all of the water-borne micro-organisms with only one weak short time residence exposure and with virtually no residual effectiveness. Both systems need some chemical biocides to effectively kill all the water borne micro-organisms that are in water. Also, some companies use low-frequency or low-strength electro-magnetic wave generators as biocide/coalescers; however, these too have proven to be only marginally effective.

Therefore, an object of further examples is to economically address and satisfactorily resolve some of the major environmental concerns that are of industry-wide importance. Objects of still further examples are to eliminate the need for brine disposal wells, eliminate the use of toxic chemicals as biocides for micro-organism destruction, or for scale prevention, and the recovery of all flow-back or produced water for reuse in subsequent hydraulic fracturing operations. Examples of the invention provide technically sound and economically viable solutions to many of the public safety issues that have concerned the industry in hydraulic fracturing.

SUMMARY OF EXAMPLES OF THE INVENTION

Advantages of various examples of the present invention include the need for less (or no) disposal of brine water, since substantially all dissolved salts are coalesced and converted into suspended particles that are separated and incorporated with recovered proppant and fines for inclusion in a feed material for fusion by pyrolysis in a rotary kiln. Similarly, examples of the invention eliminate the need for chemical biocides since the high intensity, variable, ultra-high frequency electromagnetic wave generator kills the micro-organisms that are present in water before water is injected into the formation. The electromagnetic wave also prevents the formation of scale encrustations; therefore, there is no need to add scale inhibitors to the fracturing water mixture. As a result, substantially all the flow-back water from a fracturing operation is reused with all the remaining solid materials being recycled and reconstituted into appropriately-constituted and properly sized proppants for subsequent use in fracturing operations. In addition, since volatile organic compounds are burned and vaporized, there is no need for any sludge or other types of solid waste disposal facilities.

According to one aspect of the invention, a system for use in well fracturing operations is provided, comprising: a first separator including a slurry intake and a slurry output with a first water content; a second separator having a slurry input, positioned to receive slurry from the slurry output of the first separator, and a slurry output with a second, lower water content; a kiln positioned to receive the slurry output of the second separator and having an output; a quench positioned to receive slag from the output of the kiln; a crusher positioned to receive quenched slag from the quench; a mill positioned to receive crushed material from the crusher; a first screen positioned to receive milled material from the mill, the size of the screen wherein the size of the first screen determines the upper boundary of the proppant size; and a second screen positioned to receive material passed by the first screen, wherein the size of the second screen determines the lower boundary of the proppant size. In at least one example, the system further comprises a proppant storage silo positioned to receive proppant from between the first and the second screens. In a further example, the system also includes a blender positioned to receive proppant from the silo. In a more specific example, the first separator includes a water output and the system further includes: a water storage tank positioned to receive water from the first separator, a biocide coalescer positioned to receive water from the water storage tank, the coalescer having an output feeding the blender, and at least one fracture pump receiving at least proppant and water from the blender, wherein the fracturing pump produces flow in water for well fracturing operations.

According to a further example of the invention, a method is provided for creating a proppant of a specific size from a slurry extracted from a fractured hydrocarbon well, the method comprising: separating water from the slurry, resulting in a slurry stream and a liquid stream; mixing the slurry stream with particulate, resulting in a feed material; fusing proppant material in the feed material; quenching the fused proppant material; breaking the fused proppant material; sizing the broken material for the specific size; and mixing broken material that is not of the specific size with the feed material. In some examples of the invention, the method further comprises extracting the slurry from the flow of produced fluid from a hydrocarbon well, wherein the produced fluid includes water and a slurry, wherein the separating of the slurry results in at least two streams, wherein one of the at least two streams comprises a substantially liquid stream of water and another of the at least two streams comprises the slurry. Examples of acceptable means for separating the slurry from a flow of produced fluid from a hydrocarbon well include a conventional 3-phase separator.

In at least one example, the mixing comprises: injecting the solid stream into a kiln; and injecting particulate into the kiln, wherein the injection of the particulate changes the viscosity of a slagging material wherein the slagging material comprises the solid stream and the injected particulate. In a further example, the injecting particulate into the kiln is dependent upon the viscosity of the slagging material in the kiln wherein the injecting of the particulate is increased when the slagging material is too viscous for even flow in the kiln. In some examples, the injecting of the particulate is decreased when the slagging material viscosity is so low that the flow rate through the kiln is too fast for fusing of proppant material.

In a further example, the quenching comprises spraying the fused proppant material with the liquid stream and the breaking comprises: crushing the quenched proppant material and grinding the crushed proppant material.

In still another example the sizing comprises screening and/or weight-separating.

In some examples, the fusing comprises heating the slagging material wherein volatile components in the slagging material are released in a gas phase and proppant material in the slagging material is fused. In some such examples, the rate of flow of the fused material outputting a kiln is measured, and the heating in the kiln is adjusted, based on the measuring.

In yet another example, the method further includes separating the slurry from a flow of produced fluid from a hydrocarbon well, wherein the produced fluid includes water and solids, wherein said separating the slurry results in at least two streams, and wherein one of the at least two streams comprises a substantially liquid stream of water and another of the at least two streams comprises the slurry. In at least one such example, the method also includes imparting an electromagnetic pulse to the substantially liquid stream of water, wherein proppant is mixed with the substantially liquid stream of water before or after the imparting.

According to a further aspect of the of the invention, a system is provided for creating a range of proppant of specific sizes from a slurry extracted from a fractured hydrocarbon well, the system comprising: means for separating water from the slurry, resulting in a slurry stream and a liquid stream; means for mixing the slurry stream with particulate, resulting in a feed material; means for fusing proppant material in the feed material; means for quenching the fused proppant material; means for breaking the fused proppant material; means for sizing the broken material for the specific size; and means for mixing broken material that is not of the specific size with the feed material. In at least one example, the means for mixing broken material that is not of the specific size comprises the means for fusing.

An example of the means for separating includes at two-phase separation tank with a funnel at a lower end with a conduit leading to the input to an auger. A two phase separation tank uses the principle of gravity-precipitating unit (with or without baffles). An alternative to a gravity-precipitation unit is a pressurized tank from a hydrocone system forcing slurry to a feed-hopper with an auger.

In a further example, the means for mixing the slurry stream with particulate comprises: means for injecting the slurry stream into a kiln; and means for injecting particulate into the kiln, wherein the injection of the particulate changes the viscosity of a slagging material and wherein the slagging material comprises the slurry stream and the injected particulate. One example of useful a means for injecting the s slurry stream into the kiln include: an auger from the means for separating to a kiln feed-hopper. As the auger advances the slurry stream toward the hopper more water comes off. Alternatives include a flight conveyor belt, a bucket conveying system, and others that will occur to those of skill in the art. Specific examples of useful means for injecting sand into the kiln include: a bucket-elevator conveyor with a variable drive bringing particulate (e.g. sand) from a silo where the specified sand resides. The variable drive allows changing of the amount of sand depending on the temperature measured at the exit of the kiln. The temperature is related to viscosity. For example, as temperature varies around some set point of about 2200 F, feed of sand will be increased as temperature drops. It will be decreased as temperature rises. In a more specific example, no change will be made for a variation of about 5%, while, over 5%, the amount of variation will cause increase or decrease in an amount that is dependent on the particular kiln, proppant solid feed, and other conditions that will occur to those of skill in the art. Other examples of means for injecting include a belt conveyor or flight conveyor and other equivalents that will occur to those of skill in the art.

In a further example, the means for quenching comprises means for spraying the fused proppant material with the liquid stream that was separated from the slurry (e.g., with nozzles and/or a water wall). A further alternative for cooling the material would be air quenching. In at least one example, the hot solids mixture from a kiln is deposited onto a moving, perforated steel conveyor belt, which is placed over a water collection pan. Water is applied to the mixture while on the belt.

In still a further example, the means for breaking comprises: means for crushing the quenched proppant material; and means for grinding the crushed proppant material. In one such example, the means for crushing comprises a crusher having the following specifications: an eccentric gyratory crusher (conical) so that the crushing space can be varied to obtain various sizes. Alternative crushers include: jaw crushers, roller crushers, ball crushers, and other equivalents that will occur to those of skill in the art. In some examples, the crusher reduces a solidified, agglomerated mixture into pieces having a size range of about ¼ inch to about ½ inch.

In some examples, the means for grinding comprises a grinder of the following type: a rod mill, a ball mill, an autogenous mill, bowl mill, and other equivalents that will occur to those of skill in the art. In at least some such examples, crushed material is moved by conveyor and discharged into a mixing/grinding unit where the materials are reduced in size; in at least one example, 98-99% of the material passes through a #30 sleeve opening of about 590 microns, and the passes material is similar in size and strength to sharp, fine sand.

In some examples, the means for sizing comprises a screener having at least one screen. An example of a screener that is acceptable is a vibrating screen. If the material passes the screen, it is classified as "specification size." If it is too small, it drops out to an undersized feed that is fed back to the input of the hopper of the kiln. If it is too large, it is separated into an oversized feed that is provided to the hopper at the input of the kiln. In at least one example, the over and undersized streams are combined before they are injected into the kiln. Other acceptable means for sizing includes fixed screens, rotating screens, and means for weight-separating (e.g., a cyclone through which broken material passes and/or specific gravity separation in liquid solution). Examples of acceptable cyclones will occur to those of skill in the art. Another acceptable means for separating includes specific gravity separation in liquid solution. Acceptable separation systems of that type will occur to those of skill in the art.

According to a further example, the means for fusing comprises means for heating the slagging material wherein volatile components in the slagging material are released in a gas phase and proppant material in the slagging material is fused. One example of such a means for heating the slagging material includes a slagging rotary kiln, an inclined rotary kiln, and a horizontal kiln with both direct and indirect firing capabilities. Alternative means for fusing proppant material in the feed material include: a non-slagging kiln, a vertical furnace (e.g. a Hershoff furnace, a Pacific, multi-hearth, vertical furnace), a horizontal traveling grate sintering furnace, and other equivalents that will occur to those of skill in the art. In some examples, the kiln operation involves feeding the slurry materials into the kiln and adding proppant to start the process of fusing the slurry material and proppant together into a flowing agglomerate material mass. As the mixture moves down to the kiln discharge port, the temperature of the mixture increases due to the heat being generated by the kiln's burner. At the same time, the viscosity of the mixture decreases as the temperature increases. During this same period of time, the organic materials which are carried in the mixture are burned, vaporized, and discharged into a vent stack, leaving a flowing solids material mixture. The viscosity of this flowing mixture is adjusted by either increasing or decreasing the heat released by the kiln's burner, or by adding more or less proppant to the mixture, or both.

Some examples of the invention also include means for measuring the rate of flow of the fused material outputting the kiln. Examples of means for measuring the flow of the fused material outputting the kiln includes a temperature sensor providing a signal. Other equivalent means will occur to those of skill in the art. A means for adjusting the heating in the kiln based on the measuring is provided in still other embodiments. Examples of means for adjusting the heating in the kiln based on the measuring include: changing the flow of proppant input into the kiln, based on the temperature measurement, and changing the rate of fuel flow to the kiln burner to increase or decrease the amount of heat being released in the kiln.

As mentioned above, the separating of the slurry from the flow from a well results in at least two streams, wherein one of the at least two streams comprises a substantially liquid stream of water. And, in a still more detailed example, a means for imparting an electromagnetic pulse to the substantially liquid stream of water is provided. At least one example of a means for imparting an electromagnetic pulse to the substantially liquid stream of water is disclosed in U.S. Pat. No. 6,063,267, incorporated herein by reference for all purposes. Alternatives to the device described in that patent for use in various examples of the present invention include: traditional biocide/coalescers (chemical, electrical, and mechanical) as will occur to those of skill in the art.

In at least one example, the specific pulse imparted has the following characteristics: variable, ultra-high frequencies in the range of between about 10 and 80 kHz. Other pulses having sufficient frequency to kill the micro-organisms present in water and to cause dissolved solids to coalesce will occur to those of skill in the art and may depend on the specific properties of the water at a particular well. The pulse will generally rupture the cells of the micro-organisms.

In still a further example of the invention, a means for mixing proppant with the substantially liquid stream of water is provided (for mixing either before or after the imparting). Examples of means for mixing proppant with water included a blender as will occur to those of skill in the art (for example, a screen or open, grated tank). In some examples, surface tension reducing agents are also added in the blender, as are other components that will occur to those of skill in the art. The mixture is then provided to a means of increasing the pressure of the mixture (e.g., a fracturing pump—aka "intensifier unit"—as will occur to those of skill in the art) and the pressurized mixture is injected into a well.

In still further examples, proppant is made to specific sizes from produced and/or flow-back water, as well as other sources, using a combination of a kiln, crusher, mill, and screens, to produce proppant of various sizes that those of skill in the art will recognize as being desirable in fracturing operations. See, e.g., Mining Engineering, "Industrial Materials", pp. 59-61, June 2012 (www.miningengineering magazine.com), incorporated herein by reference. The various sizes are made by adjusting the mill and screens used.

Examples of the inventions are further illustrated in the attached drawings, which are illustrations and not intended as engineering or assembly drawings and are not to scale. Various components are represented symbolically; also, in various places, "windows" into components illustrate the flow of material from one location to another. However, those of skill in the art will understand which components are normally closed. Nothing in the drawings or detailed description should be interpreted as a limitation of any claim term to mean something other than its ordinary meaning to a person of skill in the various technologies brought together in this description.

DETAILED DESCRIPTION OF EXAMPLES OF THE INVENTION

Figure 1:
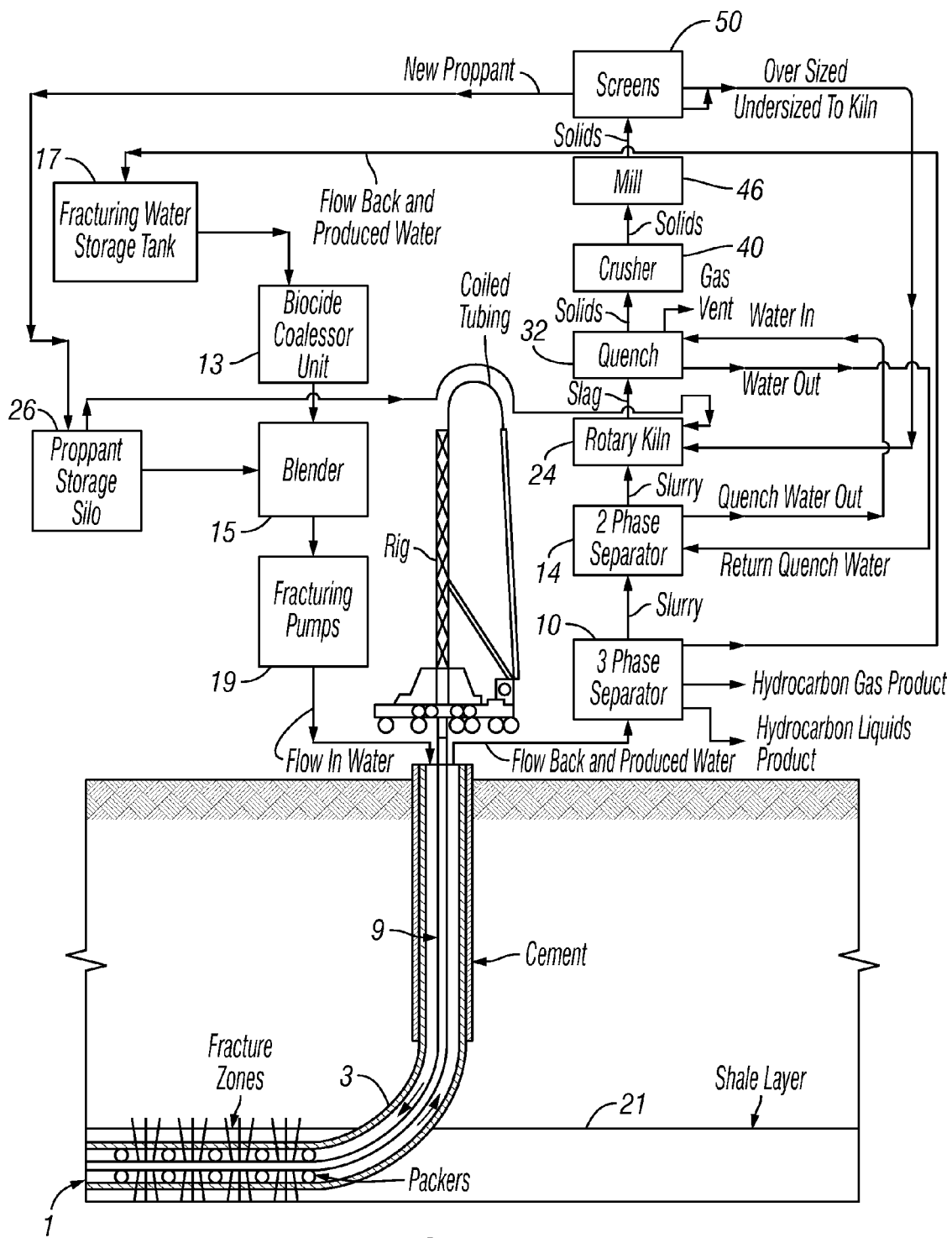
FIG. 1 is a diagram of a well site showing the flow of various materials used in various examples of the invention.

Referring now to FIG. 1, a flow diagram of the use of the invention in a hydrocarbon well having a well bore 1 with cemented casing 3 passing through fracture zones that are isolated by packers. Coil tubing 9 is inserted by rig 11 for fracture operations known to those of skill in the art.

Flow back (and/or produced) water is routed to three-phase solids/liquids/gas/hydrocarbon/water separator 10, from which any hydrocarbon liquids and gases are produced, and water from separator 10 is routed to a fracturing-water storage tank 17 which may also include water from another source (aka "make up" water). Wet solids are passed from three-phase separator 10 to two-phase separator 14, which produces water that is passed to a quench system 32 and slurry that are passed to kiln 24. Slag is passed from kiln 24 through quench system 32 to crusher 40 and then to mill 46. Milled material is separated into a specified size at screen 50 that is sent to a proppant storage silo 26, which may also include proppant from another source (e.g., a supplier of sand). Water is provided to biocide/coalescer unit 13. Proppant provided to blender 15 from silo 26, water is supplied to blender 15 from biocide/coalescer unit 13; the blended water and proppant are then provided to fracturing pumps 19, which pumps the blend into the well where it fractures the oil shale layer 21. Other additives may be provided to the blender 15, as desired. Also, proppant may be added to the water before the biocide/coalescer unit 13 in alternative examples.

Examples of the invention create a range of proppants of specific sizes from a slurry extracted from a hydraulically-fractured hydrocarbon well.

Figure 2A:
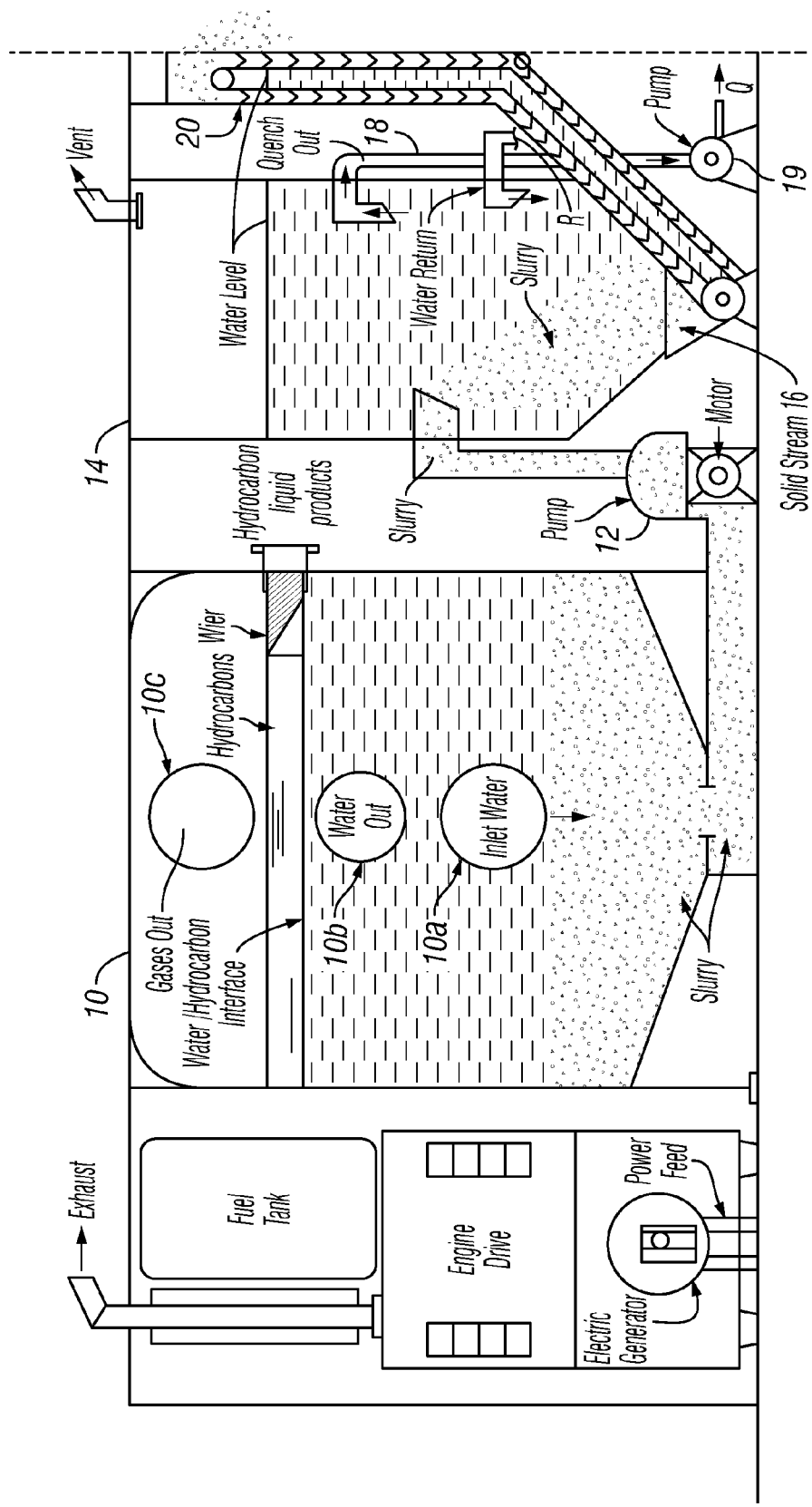
FIGS. 2A and 2B, when connected along their respective dotted lines, are a side view of an example of the invention.
Figure 2B:
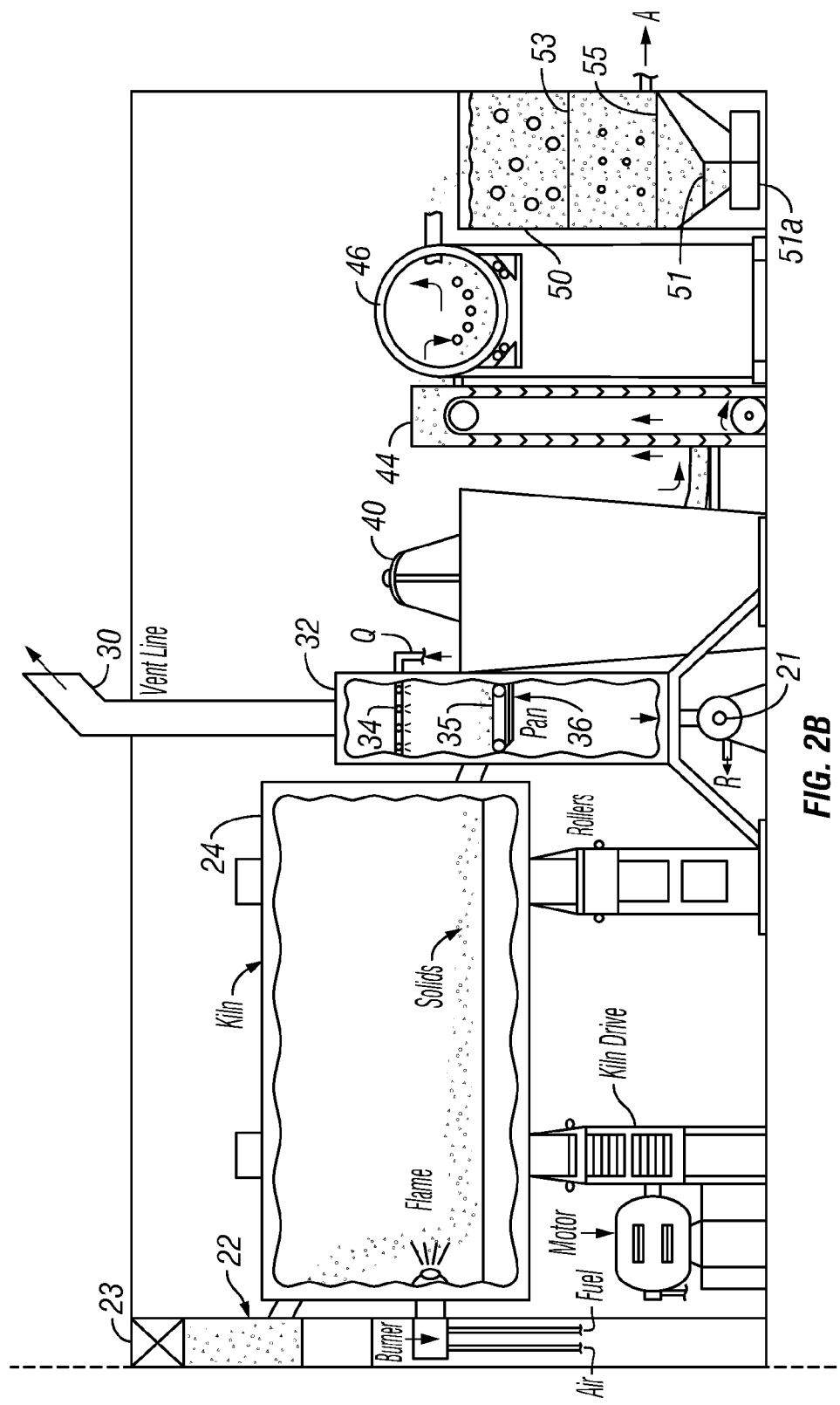
Figure 2C:
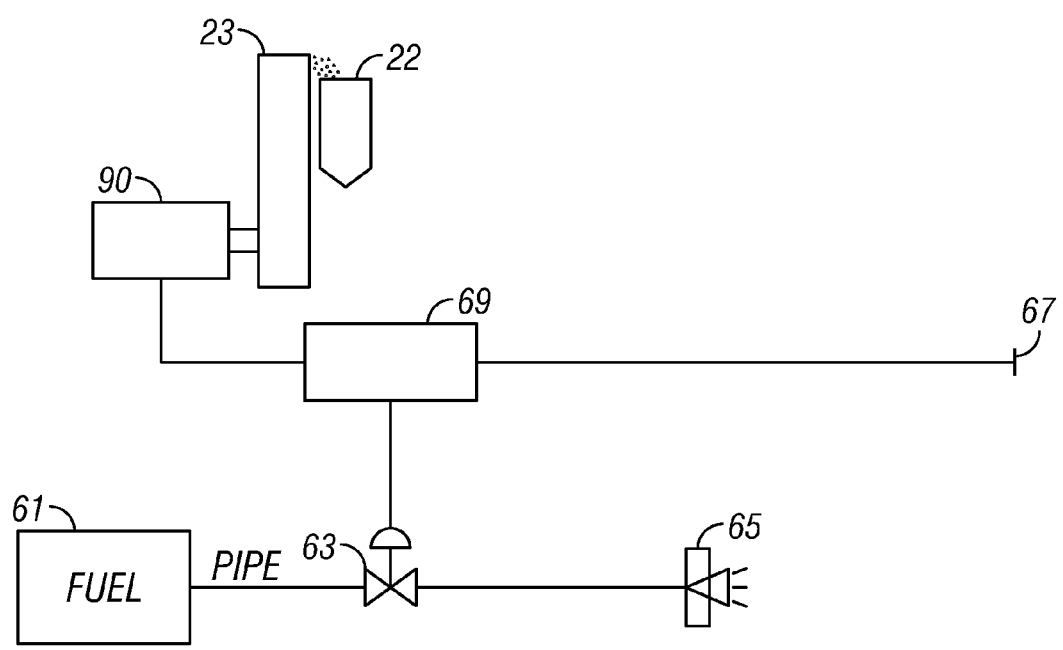
FIG. 2C is a schematic of a control system used in at least one example of the invention.

In FIGS. 2A and 2C and in FIGS. 3A-3D, a more specific example is seen. In that example, a slurry is extracted from gravity-precipitated slurry that accumulates at the bottom of a conventional three-phase separation tank 10 (which is of a common design known to those of skill in the art). In the specific example of FIG. 2A, as will occur to those of skill in the art, a water/liquid hydrocarbon interface level facilitates the separation and recovery of any liquid hydrocarbon product from the flow back or produced water stream (which is under pressure as it enters separator 10) by means of an internally or externally mounted water level indicator (not shown). That indicator sends a water level measurement signal to a pre-programmed, low level/high level water flow control data integrator (not shown). When the water level in the separator 10 reaches the high level set point, the data integrator actuates a control valve (not shown) that controls flow through the water feed pipe 10a (labeled "Inlet Water") to reduce the amount of water going into the three phase separator, and the rate of flow continues to decrease until a point is reached where the incoming amount of water equalizes and balances out the volume of water being withdrawn from the three phase separator. Conversely, if the water level in the three phase separator 10 falls below the low level set point, the data integrator actuates and further opens up the control valve in inlet pipe 10a in order to increase the amount or rate of water flow that is sufficient to stabilize the interface level. If this additional amount of water is not sufficient to stabilize the water level at the interface level, the integrator actuates a pump (not shown) and opens up another control valve (not shown) which is located in a discharge pipe (not shown) in water storage tank 17 (FIG. 1). That discharge pipe is connected to the inlet pipe 10a; thus water from fracturing water storage tank 17 continues to flow into the three phase separator together with the flow back or produced water until the water level in the separator 10 reaches the proper interface level. Then, the make-up water control valve closes and the make-up water pump is shut off. This control sequence is necessary in order to achieve steady state and continuous operational stability in the separation and recovery of any liquid hydrocarbon product that is carried into the three phase separator by the flow back or produced water feed stream.

A weir and baffle configuration (commonly known in gas/oil separation units) facilitates the separation and recovery of the liquid hydrocarbon product, if any, by using the interface level as the maximum height of the water in the separator and allowing the lighter liquid hydrocarbons to float on top of the water layer and then be withdrawn as liquid hydrocarbon product after it flows over the liquid hydrocarbon product weir and is withdrawn at the hydrocarbon liquid product outlet flange connection. A horizontal baffle under the weir limits the amount of potential water carry over that might be comingled with the liquid hydrocarbon product stream. As the flow back or produced water stream enters the three phase separator 10 the depressurization releases the lighter hydrocarbon gases and their release assists in the flotation of the liquid hydrocarbon products as well as the release of the gaseous hydrocarbon products through outlet 10c. Water flows out of separator 10 through pipe 10b to a surge tank (not shown) and is then pumped back to water tank 17 (FIG. 1).

From separator 10, a motor-driven positive displacement diaphragm-type sludge pump 12 moves the slurry upwards to the inlet opening of a two-phase water/solids separation tank 14 resulting in a slurry stream 16 and a liquid stream 18 that is pumped by pump 19 to a quench (labeled "Q"). From the bottom of the two-phase water/solids separation tank 14, a bucket-elevator conveyor 20 transports the precipitated slurry materials from the lower part of the water/solids separation tank 14 upwards from the water level and discharges them into the feed-hopper 22 (FIG. 2B). The discharge is seen in FIG. 2A as going over a dashed line, which connects with the dashed line to the left of FIG. 2B where slurry is seen accumulating in feed-hopper 22 of a slagging, rotary-kiln 24, leaving the slurry water to remain in the water/solids separation tank 14 and the elevator 20. As a result, all separation is carried out at atmospheric pressure rather than in pressurized-vessels (as is current practice).

In the feed-hopper 22, the slurry materials from the water/slurry separation tank are mixed with specification proppant from silo 26 (FIG. 1), as well as under-sized and over-sized solid materials that come from a final screening unit 50 (described below).

As the fusion process for the proppant material proceeds, inorganic proppant materials are fused into a uniform mass and volatile organic materials that may have been present in the feed stream from the water/solids separation tank 14 are burned and vaporized prior to the gases being eventually discharged into an exhaust vent 30.

The proppant material exiting from the rotary kiln 24 is quenched with a stream of water to reduce the temperature of the material, as it emerges from the outlet of the kiln 24. In some examples, discharged material flows onto a perforated, motor-driven stainless-steel conveyor belt 35 and the water cascades, through spray nozzles 34 on to the moving belt 35 thereby solidifying and cooling the proppant material. The water used for quenching the proppant material comes from the water/solids separation tank 14 (see FIG. 2A) using, e.g., a motor-driven centrifugal pump 19 to push the water to the quench nozzles 34 of FIG. 3B. An excess water collection pan 36 is positioned under the conveyor belt 35 to collect and recover any excess quench water and convey it back to the water/solids separation tank 14 by a motor-driven centrifugal pump 21 and a pipeline shown flowing to return "R" of FIG. 2A.

Quenching the hot proppant material, as it is discharged from the kiln 24, causes a multitude of random, differential-temperature fractures or cracks due to the uneven contraction of the proppant material and the high internal stresses caused by rapid quenching. The different sized pieces of proppant material are discharged directly into the material crusher 40.

Crushing or breaking up the large irregular pieces of proppant material and reducing their size is accomplished, in some examples, by a motor-driven, vertical-shaft, gyratory, eccentric cone or jaw crusher, known to those of skill in the art. The degree of the size reduction is adjusted by changing the spacing or crusher gap, thus allowing a range of different material sizes to be produced, as is known to those of skill in the art.

Sizing of the proppant material is accomplished by the grinding or milling of the crushed proppant material after the proppant material is discharged at the bottom of the crusher. In the illustrated example, the material is conveyed upwards to ball mill 46 by a bucket-elevator conveyor 44. In at least one alternative example, a rod mill is used. The mill 46 is adjusted to grind the proppant material to different specific size ranges by changing rotation, the size and spacing of the rods or balls in the mill 46 (or its rotation).

Figure 3A:
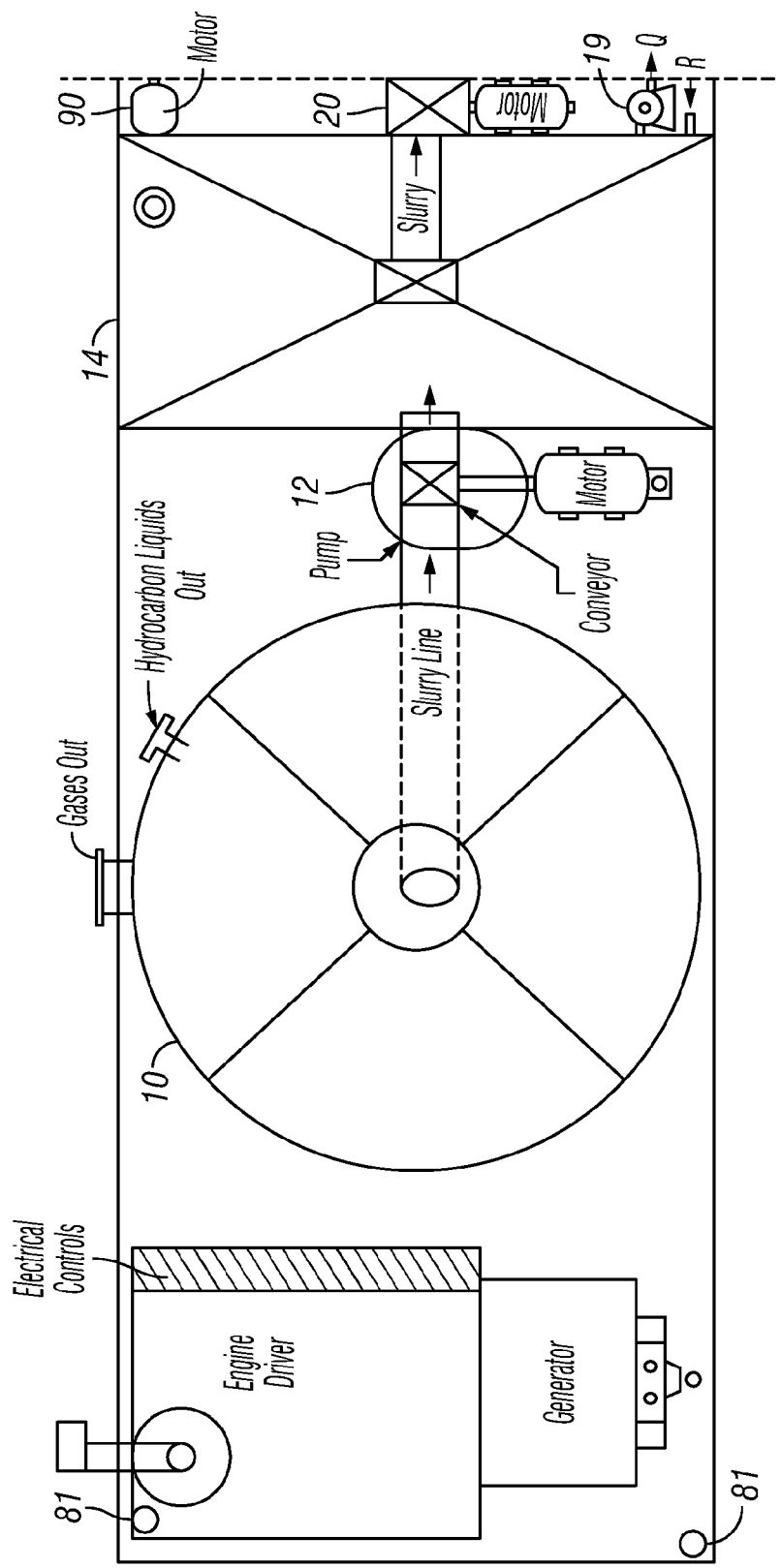
FIGS. 3A and 3B, when connected by the overlapping components next to their dotted lines, are a plan view of the example of FIGS. 2A and 2B.
Figure 3B:
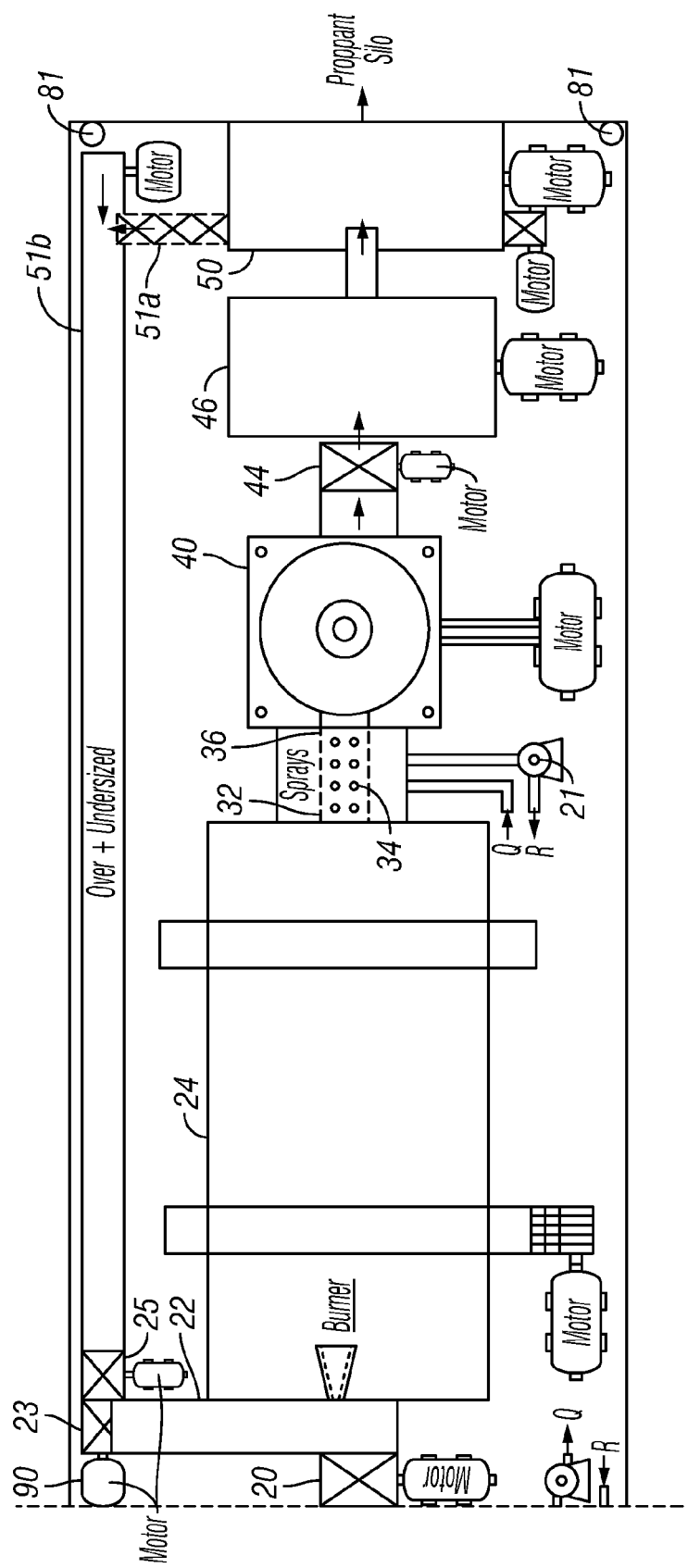

The milled proppant material flows by gravity down through the grinding zone of the mill and is discharged onto vibrating screen 50 where the mesh openings are selectively sized to a specific sieve value. For example, for soft mineral shale the mesh openings are in the 590 micron range or a #30 sieve. For hard mineral shale (for example) the mesh openings would be in the 150 micron range or a #100 sieve. Proppant material of the proper size flows downward by gravity through a selectively sized screen exiting at "A." Proppant material that is too large to pass through the slanted, vibrating screen 53 exits onto belt 51a (seen better in FIG. 3B), and the rest drops to screen 55. Proppant material between the sizes of screens 53 and 55 exit as correctly sized proppant at "A" and is transported to silo 26 (FIG. 1). Under-sized proppant drops onto belt 51a which conveys the under-sized and over-sized proppant to belt 51b, which then carries the proppant back to kiln 24, through elevator 25. FIGS. 3A and 3B illustrate a top view of an example of the invention in which the components are mounted on a trailer or skid mounted that are assembled at a well site with biocide and other components (e.g., FIGS. 4 and 5). Such trailers or skids are leveled in some examples by leveling jacks 81.

Figures 3C, 3D:
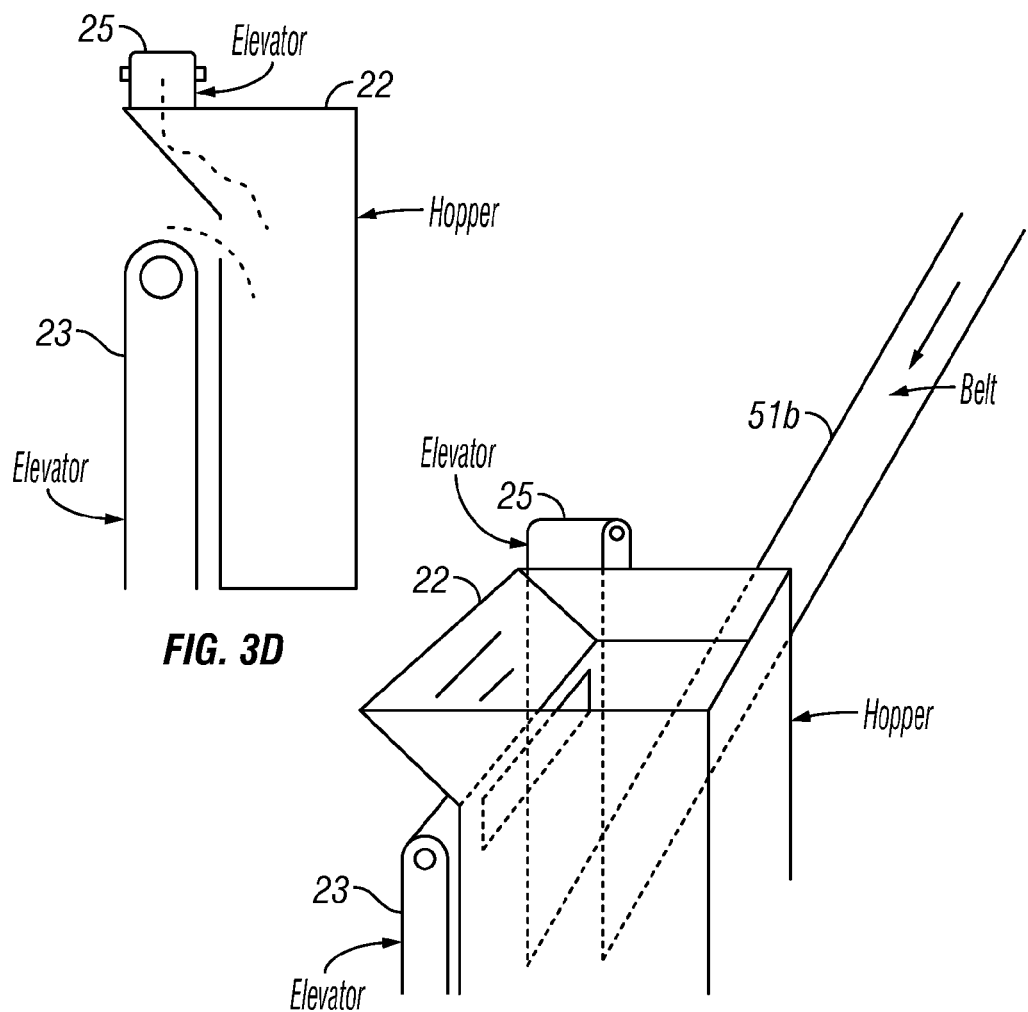
FIGS. 3C and 3D are an isometric and side view, respectively, of an aspect of the examples of FIGS. 2A-2B and FIGS. 3A-3B.

As seen in FIGS. 3C and 3D, elevator 25 deposits material into the top of feed hopper 22 and elevator 23 deposits material from the silo into feed hopper 22 from a lower level through an opening in feed hopper 22.

The properly-sized proppant materials flow is fed, by gravity, into a specification proppant container (not shown) for transfer to the specification proppant storage silo 26 (FIG. 1) which may also contain specification proppant from another source.

Referring now to FIG. 2B, it is desirable to control the viscosity of the proppant feed mixture, to attain stability of sustaining an optimum fusion temperature (in some examples, approximately 2200 degrees Fahrenheit). As the proppant feed mixture temperature is rising, due to the heat in kiln 24, the process of fusing the various inorganic materials into a uniformly viscous mass is achieved when the temperature in the proppant mixture reaches the fusion temperature of silicon dioxide or sand. The viscosity of the proppant material is a function of the temperature of the material itself. Such control is accomplished in various ways.

In at least one example, the temperature of the fused material is measured, by any means know to those of skill in the art (for example, an optical pyrometric sensor in quench system 32, as it exits from the kiln. If the temperature is above the fusion point of the material, it will be too liquid, and the fuel to the kiln is reduced. At the same time, more specification proppant may be added to the feed hopper 22. This affects the temperature because the material coming from the slurry is not uniform and is not dry; adding proppant from the silo evens out the variability.

Referring now to FIG. 2C, a schematic is seen in which sensor 67 signals integrator 69 with the temperature of the output of the kiln 24. Integrator 69 then controls variable-speed motor 90 (FIG. 3A) that operates elevator 23 (see also FIG. 3B) that carries proppant from the bottom of proppant silo 26 and discharges it into the slagging rotary kiln feed-hopper 22. The different material streams are comingled in the feed-hopper 22 before they enter the revolving drum of the kiln 24. The proportion or amount of specification proppant that is needed to be added to the material stream from the water/solids tank 14 is adjusted, depending upon the changes in the composition of the materials coming from the water/solids separation tank 14. This increases uniformity of the proppant material feed mixture that kiln 24 uses in the fusion process. In at least one example, if the temperature is too high, the fuel to the burner is reduced; if that does not correct it, the amount of proppant to the kiln will be increased. Likewise, if the temperature is too low, the fuel is increased to the burner; and, if that does not work, the amount of proppant is decreased. Alternative arrangements will occur to those of skill in the art.

Referring back to FIG. 2C, integrator 69 also controls valve 63 to increase or decrease the supply of fuel 61 for kiln burner 65.

Referring again to FIG. 1, one example of the invention is seen in which separator 10 is seen feeding the slurry to separator 14, and water from separator 10 is the joined with new "make-up" (in tank 17) water to be used in injection in a new fracturing job. The combined flows are treated by an electro-magnetic biocide/coalescer 13 of the type described in U.S. Pat. No. 6,063,267, incorporated herein by reference for all purposes (commercially available as a Dolphin model 2000), which is set, in at least one example, to impart an electromagnetic pulse having the following characteristics selectable, variable, and tunable frequency in a range between about 10-80 KHz. Such a pulse is sufficient to kill biological organisms and to cause a positive charge to be applied to the water, making the dissolved solids capable of being precipitated or coalesced in the well.

Figure 4:
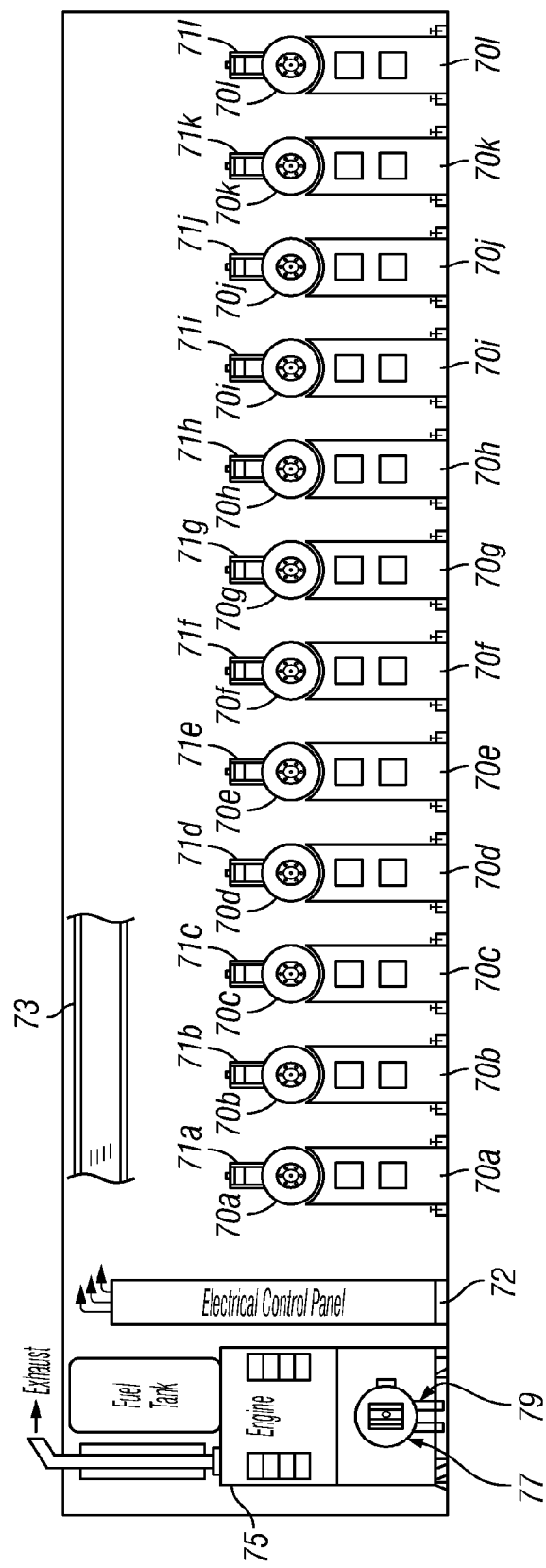
FIG. 4 is a side view of a further example of the invention.
Figure 5:
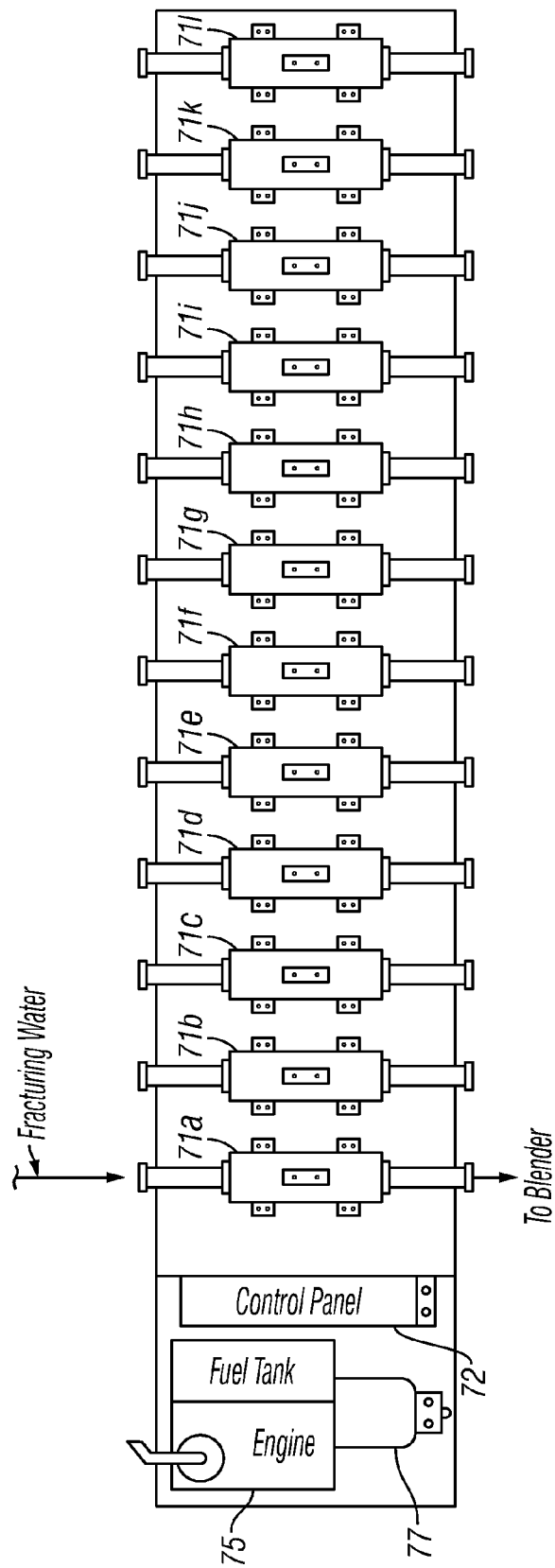
FIG. 5 is a plan view of the example of FIG. 4.

FIGS. 4 and 5 are side and top views, respectively, of an example trailer-mounted or skid-mounted system that includes a set of biocide/coalescers 70a-70l, organized to receive fracturing tank water in the type of flow rate used in common shale-fracture operations. Such units are run from an electrical control panel 72, that is connected to an overhead power and control distribution rack 73 that connects to overhead power feed components 71a-71l. Power is supplied by an engine 75 that turns an electrical generator 77 that is connected to power feed 79 for supplying power in a manner known to those of skill in the art.

It should be kept in mind that the previously described embodiment(s) is only presented by way of example and should not be construed as limiting the inventive concept to any particular physical configuration. Changes will occur to those of skill in the art from the present description without departing from the spirit and the scope of this invention. Each element or step recited in any of the following claims is to be understood as including to all equivalent elements or steps. The claims cover the invention as broadly as legally possible in whatever form it may be utilized. Equivalents to the inventions described in the claims are also intended to be within the fair scope of the claims. All patents, patent applications, and other documents identified herein are incorporated herein by reference for all purposes.

What is claimed is:

1. A method for creating a proppant of a specific size from a slurry extracted from a fractured hydrocarbon well, the method comprising:
   separating water from the slurry, resulting in a solid stream and a liquid stream;
   mixing the solid stream with particulate, resulting in a feed material;
   fusing proppant material in the feed material;
   quenching the fused proppant material;
   breaking the fused proppant material;
   sizing the broken material for the specific size; and
   mixing broken material that is not of the specific size with the feed material.

2. A method as in claim 1 wherein said mixing comprises:
   injecting the feed material into a kiln; and
   injecting particulate into the kiln, wherein the injection of the particulate changes the viscosity of a slagging material wherein the slagging material comprises the slurry stream and the injected particulate.

3. A method as in claim 2 wherein the injecting of the particulate is increased when the slagging material is too viscous for even flow in the kiln.

4. A method as in claim 2 wherein the injecting of the particulate is decreased when the slagging material is so viscous that the flow rate through the kiln is too fast for fusing of proppant material.

5. A method as in claim 1 wherein said quenching comprises spraying the fused proppant material with the liquid stream.

6. A method as in claim 1 wherein said breaking comprises:
   crushing the quenched proppant material; and
   grinding the crushed proppant material.

7. A method as in claim 1 wherein said sizing comprises screening.

8. A method as in claim 1 wherein said sizing comprising weight-separating.

9. A method as in claim 1 further comprising:
   measuring the rate of flow of the fused material outputting a kiln; and
   adjusting the heating in the kiln based on the measuring.

10. A method as in claim 1 further comprising separating the slurry from a flow of produced fluid from a hydrocarbon well, wherein the produced fluid includes water and slurry, wherein said separating the slurry results in at least two streams, wherein one of the at least two streams comprises a substantially liquid stream of water and another of the at least two streams comprises the slurry.

11. A method as in claim 10 further comprises imparting an electromagnetic pulse to the substantially liquid stream of water.

12. A method as in claim 11 wherein proppant is mixed with the substantially liquid stream of water before the imparting.

13. A method as in claim 11 wherein proppant is mixed with the substantially liquid stream of water after the imparting.

14. A system for creating a proppant of a specific size from a slurry extracted from a fractured hydrocarbon well, the system comprising:
   means for separating water from the slurry, resulting in a wet solid stream and a liquid stream;
   means for mixing the wet solid stream with particulate, resulting in a feed material;
   means for fusing the feed material resulting in fused proppant material;
   means for quenching the fused proppant material;
   means for breaking the fused proppant material;
   means for sizing the broken material for the specific size; and
   means for mixing broken material that is not of the specific size with the feed material.

15. A system as in claim 14 wherein said means for mixing the wet solids stream with particulate comprises:
   means for injecting the solid stream into a kiln; and
   means for injecting particulate into the kiln, wherein the injection of the particulate changes the viscosity of a slagging material and wherein the slagging material comprises the wet solid stream and the injected particulate.

16. A system as in claim 14 wherein said means for quenching comprises means for spraying the fused proppant material with the liquid stream.

17. A system as in claim 14 wherein said means for breaking comprises:
   means for crushing the quenched proppant material; and
   means for grinding the crushed proppant material.

18. A system as in claim 14 wherein said means for sizing comprises at least one screen.

19. A system as in claim 14, wherein said means for heating comprises a kiln.

20. A system as in claim 19 further comprising: means for measuring the rate of flow of the fused material outputting the kiln; and means for adjusting the heating in the kiln based on the measuring.

21. A system as in claim 14 further comprising means for separating the slurry from a flow of produced fluid from a hydrocarbon well, wherein the produced fluid includes water and a slurry, wherein the separating of the slurry results in at least two streams, wherein one of the at least two streams comprises a substantially liquid stream of water and another of the at least two streams comprises the wet solids stream.

22. A system as in claim 21 further comprises means for imparting an electromagnetic pulse to the substantially liquid stream of water.

23. A system as in claim 22 further comprising means for mixing proppant with the substantially liquid stream of water before the means for imparting.

24. A system as in claim 22 further comprising means for mixing proppant with the substantially liquid stream of water after the imparting.

25. A system as in claim 14 wherein said means for mixing broken material that is not of the specific size comprises the means for fusing.

\* \* \* \* \*

UNITED STATES PATENT AND TRADEMARK OFFICE
CERTIFICATE OF CORRECTION

PATENT NO. : 8,424,784 B1
APPLICATION NO. : 13/594497
DATED : April 23, 2013
INVENTOR(S) : Joseph G. Munisteri It is certified that error appears in the above-identified patent and that said Letters Patent is hereby corrected as shown below:

In the Specification

Column 1, Line 66, "were" should read --where--

Column 5, Line 43, "nacolites" should read --nahcolites--

Column 7, Line 10, "nacolites" should read --nahcolites--

Column 7, Line 51, "seeking out digesting" should read --seeking out and digesting--

Column 9, Line 51, "3-phase separator." should read --three-phase separator.--

Column 10, Line 48, after "injecting the" delete "s"

Signed and Sealed this
Twenty-second Day of October, 2013

Teresa Stanek Rea
*Deputy Director of the United States Patent and Trademark Office*

(12) SUPPLEMENTAL EXAMINATION CERTIFICATE
United States Patent
Munisteri

(10) Number: US 8,424,784 F1
(45) Certificate Issued: May 28, 2014

Control No.: 96/000,054

Filing Date: Mar. 28, 2014

Primary Examiner: Jimmy G. Foster

No substantial new question of patentability is raised in the request for supplemental examination. See the Reasons for Substantial New Question of Patentability Determination in the file of this proceeding.

(56) Items of Information

U.S. PATENT DOCUMENTS

| | | |
|---|---|---|
| 7,040,418 | 5/2006 | Slater et al. |
| 2009/0118145 | 5/2009 | Wilson et al. |
| 2011/0077176 | 3/2011 | Smith et al. |
| 2012/0070339 | 3/2012 | Lawal |

OTHER DOCUMENTS

International Search Report, including Written Opinion for PCT/US2013/027429    4/2013